April 5, 1966 J. W. PAGE 3,243,952
RETAINING PIN FOR TWO PART CHAIN LINK
Filed Nov. 18, 1963
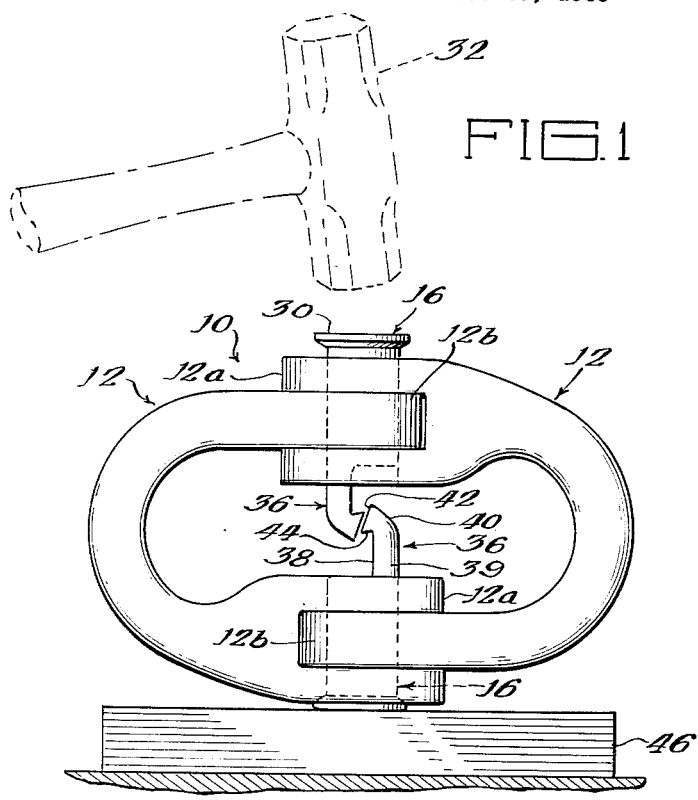
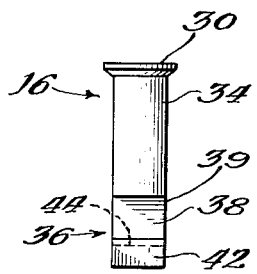
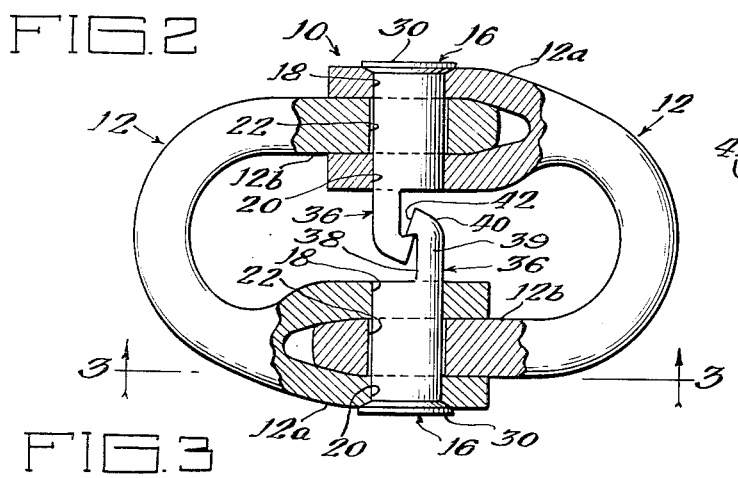
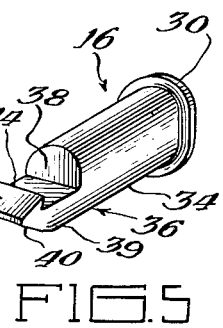
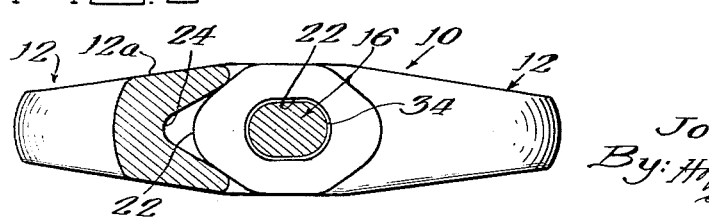
Inventor:
John W. Page
By: Hofgren, Wegner, Allen,
Stellman & McCord
Attorneys United States Patent Office 3,243,952
Patented Apr. 5, 1966

3,243,952
RETAINING PIN FOR TWO PART CHAIN LINK
John W. Page, Chicago, Ill., assignor to Page Engineering Company, a corporation of Illinois
Filed Nov. 18, 1963, Ser. No. 324,381
4 Claims. (Cl. 59—85)

This invention relates to chain links and more particularly to a new and improved retaining pin for a separable two-part chain link.

This invention is an improvement of the invention disclosed in my Patent No. 2,777,284, entitled "Two-Part Chain Link With Two Aligned Pins Holding Said Parts Together," issued January 15, 1957.

Heavy chain links are frequently used with large earth moving equipment. This equipment usually is in use at a remote point in the field which is distant from repair shops or the like. Large earth moving equipment usually represents a large investment and any loss of operating time due to break down thereof means a relatively large loss of money.

As disclosed in my aforesaid patent, heavy chain links were formerly repaired by welding. In my patent, No. 2,777,284, I disclosed a repair link which could be placed in a chain with the use of relatively simple tools such as a hammer or the like. The chain link disclosed therein consisted of two half links having pins driven transversely therethrough and held together by a third U-shaped pin to secure the link as a unit. It is the scope of this invention to provide a new and improved retaining pin for a two-part chain link which eliminates the need for the second retaining pin to secure the first retaining pins together as a unit.

It is therefore a general object of this invention to provide a new and improved retaining pin for a two-part chain link.

It is a primary object of this invention to provide a new and improved retaining pin for a two-part chain link adapted for locking engagement with an identical axially opposed retaining pin in response to axial blows thereon.

It is another object of this invention to provide a new and improved retaining pin for a two-part chain link adapted to lock with a duplicate pin and which eliminates the need for a third pin to secure the two identical pins together.

Other objects, features and advantages of the present invention will be apparent from the following description of the preferred embodiment illustrated in the accompanying drawing, in which:

FIGURE 1 is a plan view of a two-part chain link having the retaining pins of this invention positioned therein preparatory to locking engagement by the application of an axial end blow on one of the pins by means, such as a hammer, shown in dotted outline;

FIGURE 2 is a plan view, partially broken away, showing the assembled two-part chain link with the retaining pins of this invention in locking engagement after being subjected to an axial end blow as indicated in FIGURE 1;

FIGURE 3 is a section view taken along the line 3—3 of FIGURE 2;

FIGURE 4 is an elevational view of the retaining pin of this invention; and

FIGURE 5 is a perspective view of the retaining pin of this invention.

Referring now to the drawings, in FIGURE 1 there is shown an assembled two-part chain link 10 including two identical half links 12 with the two identical retaining pins 16 of this invention being utilized to secure the half links together as a unit. Each half link is generally U-shaped in plan having a bifurcated clevis at one end, such as 12a, and an eye portion, such as 12b at the other end. Each of the half links is preferably cast of a high manganese steel to be capable of withstanding heavy shock loads. Such links are particularly suitable for use with heavy earth moving equipment and may vary in size from 1¼" to 3". It is to be understood that the retaining pin of this invention may be used with two-part chain links of much smaller size and much different material.

The clevis portion of each link is provided with two laterally aligned pin receiving openings, such as 18 and 20. The eye portion of each link is similarly provided with an opening 22 which, as shown in FIGURES 1 and 2, is in axial alignment with the openings 18 and 20 to permit the registration of the retaining pin 16 therein. The clevis portions and the eye portions are provided with structure which facilitates the initial mating engagement of the two half links. The eye 12b is provided with a rounded nose, such as 22, which is received in the generally rounded V-shaped recess formed in the hollow between the bifurcated ends of the clevis portions. As illustrated in FIGURE 3, when the links are assembled this structure serves to properly align the two links so that the aperture thereof is in appropriate registry and to maintain the links in a single plane against turning, one relative to the other.

The pin is provided with an enlarged head 30 for receiving axial end blows from suitable means, such as a hammer 32. The pin shaft 34 is relatively thick and elongate to withstand the loads imposed thereon and, in the preferred embodiment, is shown as obround in cross section. Preferably, the outer diameter of the shaft portion 34 is slightly smaller than the inner diameter of the openings 18, 20 and 22 to permit insertion of the pin therein with little "play" relative thereto so that when the chain links are assembled the unit will be substantially rigid.

The free end of the pin 16 is provided with a camming and locking portion 36. The pin is notched as at 38 to form an offset finger 39 which is turned slightly inwardly in the direction of the notching at the distal end 40 thereof. The terminal face of the distal end 40 is provided with an inclined cam surface 42 having a locking lip 44 thereunder which projects under the notched portion 38.

To assemble the chain link 10, the two chain link halves 12 are placed together in mating relationship as shown in FIGURE 1 with the eye portions 12b inserted into the bifurcated clevis portions 12a. The nose portions 22 and recesses 24 serve to properly align the openings 18 and 20 and to maintain the half links in a common plane. Two such pins 16 are inserted through the aligned openings and the pin is placed on a supporting base 46 as shown in FIGURE 1. The lowermost pin 16 is inserted fully in the openings of one of the bifurcated clevis portions 12a and eye portions 12b. The uppermost pin 16 will drop to a point where the two inclined cam surfaces 42 will meet in facial engagement.

It is to be noted that the finger 39 is substantially a continuation of one side of the shaft 34. The entire body of the finger portion is offset relative to the longitudinal axis of the pin shaft. However, portions of the inclined cam face of each pin intersect the longitudinal axis of the pin shaft. As an axial end blow is applied to the enlarged head 30 of one retaining pin 16, the pin will be forced downwardly along the facially engaging inclined cam surface 42 which will cause the finger portions 39 of the pins to yield slightly and move relatively outwardly. As the pin 16 is driven to a point where the locking lips 44 are on a line with each other, further end blows applied to the pin will cause the locking lips to pass each other and the pins to snap together with considerable force. As the finger portions 39 spring back to a normal upright position, the two locking lips 44 will overlap thus securely locking the two pins together against outward axial movement, as shown in FIGURE 2, and providing a firm chain link unit 10 from the two half links 12.

The assembled chain link comprises two identical chain half links 12 and two identical retaining pins 16. The pin 16 eliminates the use of another locking member as was required with the retaining pins disclosed in my aforementioned application thus reducing the cost of manufacturing a chain link assembly as shown herein as well as eliminating the need for storing additional parts in the field. The retaining pin 16 as disclosed in this invention is relatively economically produced by casting. Two-part chain links may be assembled as a unit by the use of these retaining pins by the application of axial end force thereon through such simple means as a hammer, and a third locking member is no longer necessary.

The retaining pins are also capable of being easily separated and removed with the use of commonly available tools. Separation of the retaining pins is a two-step process and requires the use of some sort of a relatively heavy metallic elongated rod-type device which can be forcefully driven between two members by the application of axial end blows thereon. Devices suitable for this purpose which are commonly found in field conditions are chisels, drift pins or even an extremely heavy screwdriver. Two such removal devices or rods are necessary. The first is inserted between the inclined cam face 42 of one of the pins and the interior of the notch 38 of the other pin. The removal rod is driven axially transverse to the longitudinal extent of the retaining pins to cause the retaining pins to spread apart along the line of their respective locking lips. When the retaining pins have been separated far enough so that no portion of the locking lips overlie each other, then a second removal rod may be positioned between the free end 40 of one of the retaining pins and the interior of the clevis 12a so that it can be driven with a hammer to move the retaining pins axially past one another so that they might be easily withdrawn from the link.

The foregoing detailed description has been given for clearness of understanding only, and no unnecessary limitations should be understood therefrom, for some modifications will be obvious to those skilled in the art.

I claim:

1. A retaining pin for a two-part chain link having aligned pin receiving holes therein, comprising: a first enlarged shaft portion of a size to be received in said holes; a second reduced shaft portion, said second portion having a cam surface thereon with a portion of said cam surface intersecting the longitudinal axis of said first shaft portion, said second portion further having locking means behind said cam surface so that two such pins can be inserted opposite each other and locked as a unit by the application of axial end blows thereon.

2. A retaining pin for a two-part chain link having aligned pin receiving holes therein, comprising: a first enlarged shaft portion of a size to be received in said holes, a second reduced shaft portion offset relative to the longitudinal axis of said first portion, said second portion having a cam surface at the free end thereof with a portion of said cam surface intersecting the line of the longitudinal axis of said first shaft portion, said second portion further having locking means behind said cam portion so that two such pins can be inserted opposite each other and locked as a unit by the application of axial end blows thereon.

3. A retaining pin for a two-part chain link having aligned pin receiving holes therein for receiving locking pins to secure the link as a unit, comprising: a first enlarged larged shaft portion of a size to be received in said holes, said first portion having an enlarged head thereon; a second reduced shaft portion offset relative to the axis of the first portion, said second portion comprising a finger projecting from one side of the first portion and being bent inwardly at the free end thereof with a cam surface thereat and a portion of said cam surface intersecting the longitudinal axis of said first shaft portion, said second portion further having locking means behind said cam means so that two such pins can be inserted opposite each other and locked as a unit by the application of axial end blows thereon.

4. A retaining pin for a two-part chain link having aligned pin receiving holes therein for receiving fastening pins to secure the link as a unit, comprising: first enlarged shaft portion of a size to be received in said holes, said first portion having an enlarged head thereon; a second reduced shaft portion offset relative to the axis of the first portion, said second portion comprising a projecting finger at one side of said first portion and turned inwardly at the free end thereof and having an inclined cam face formed on the face of the free end with a portion of said inclined face intersecting the longitudinal axis of said shaft, said second portion further having locking means behind said cam surface so that two such pins may be inserted in said aligned openings opposite each other with their respective cam surfaces in facial engagement and locked as a unit by the application of axial end blows thereon whereby the cam faces will be caused to move axially relative to each other and the projecting fingers will move laterally relative to each other in response to the axial movement of the cam faces and the respective locking surfaces of each pin will mate in locking engagement when the respective cam surfaces have been driven past one another.

References Cited by the Examiner

UNITED STATES PATENTS 2,777,284   1/1957   Page _____ 59—85

CHARLES W. LANHAM, *Primary Examiner.*